United States Patent [19]

Ford, Jr.

[11] 4,182,830

[45] Jan. 8, 1980

[54] VINYL ESTER URETHANES

[75] Inventor: Ernest C. Ford, Jr., Newark, Del.

[73] Assignee: ICI Americas Inc., Wilmington, Del.

[21] Appl. No.: 927,461

[22] Filed: Jul. 24, 1978

[51] Int. Cl.² .............................................. C08G 18/32
[52] U.S. Cl. .......................................... 528/75; 528/79
[58] Field of Search ...................................... 528/79, 75

[56] References Cited

U.S. PATENT DOCUMENTS 3,754,909  8/1973  Feltzin et al. .......................... 528/79
3,876,726  4/1975  Ford et al. ....................... 260/859 R

*Primary Examiner*—Maurice J. Welsh
*Attorney, Agent, or Firm*—H. Jolyon Lammers

[57] ABSTRACT

Vinyl ester urethane resins prepared by reacting (a) the reaction product of a polyoxyalkylene bisphenol A and a polycarboxylic acid or anhydride, (b) a polyfunctional isocyanate having an average isocyanate functionality of greater than two, and (c) a monohydroxyl-terminated ester of acrylic acid or methacrylic acid are useful in thermosetting fiber reinforced laminates.

27 Claims, No Drawings

VINYL ESTER URETHANES

BACKGROUND OF THE INVENTION

1. Field of the Invention

The present invention relates generally to vinyl ester urethane resins, to methods of preparing said resins, and to compositions containing said resins. More particularly, the invention relates to vinyl ester urethane resins having the following general formula:

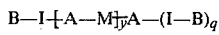

wherein

A is a radical derived from a polyoxyalkylene bisphenol, A having the following formula:

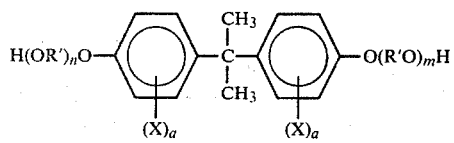

wherein
R' is $C_1$–$C_4$ alkylene group,
X is halogen or a $C_1$–$C_4$ alkyl group,
a is an integer equal to from 0 to 2, and
m and n are integers each of which is equal to at least 1 and the sum of which is equal to from 2.0 to about 8.0;
M is a radical derived from (A) an unsaturated, aliphatic, polycarboxylic acid or an anhydride thereof, (B) a saturated aliphatic polycarboxylic acid or an anhydride thereof, (C) an aromatic polycarboxylic acid or anhydride thereof or (D) mixtures of A, B, or C;
I is a radical derived from an isocyanate having an isocyanate functionality greater than 2;
B is a radical derived from a monohydroxyl-terminated ester of unsubstituted or substituted acrylic or methacrylic acid wherein the substituents are halogen or $C_1$–$C_4$ alkyl groups;
Y is an integer equal to from 1 to about 12.

The resins are prepared by reacting an isocyanate having a functionality of greater than two, and a monohydroxyl-terminated ester of the substituted or unsubstituted acrylic acid with the condensation product prepared by reacting a polyoxyalkylene bisphenol A with a polycarboxylic acid or anhydride. The resins are useful in thermosetting fiber reinforced laminates or castings having improved retention of properties at elevated temperatures.

2. Description of the Prior Art

Vinyl ester urethanes are known in the art. See for example Ford, E. C. Jr., et al., U.S. Pat. No. 3,876,726 which discloses vinyl ester urethanes prepared by reacting a polyoxyalkylene bisphenol A with a unsaturated aliphatic dicarboxylic acid and reacting the product thereof with a diisocyanate and a hydroxyl-terminated ester of a methacrylic or an acrylic acid. It has now been discovered that certain vinyl ester urethanes which utilize isocyanates having higher isocyanate functionalities have increased retention of properties in the cured products when subjected to a high temperature environment. Additionally, the resins have shown a remarkable improvement in process properties of sheet molding formulations particularly in the areas of handleability, such a tackiness and green strength and maturation of the uncured resins resulting in more efficient processes.

SUMMARY OF THE INVENTION

In accordance with the present invention, vinyl ester urethane resins are prepared having the following general formula:

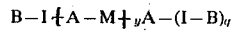

wherein

A is a radical derived from a polyoxyalkylene bisphenol A having the following formula:

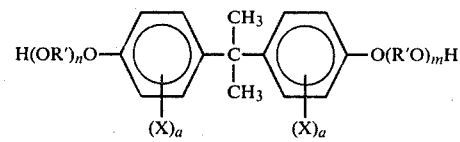

wherein
R' is $C_1$–$C_4$ alkylene group,
X is halogen or a $C_1$–$C_4$ alkyl group,
a is an integer equal to from 0 to 2, and
m and n are integers each of which is equal to at least 1 and the sum of which is equal to from 2.0 to about 8.0;
M is a radical derived from (A) an unsaturated aliphatic polycarboxylic acid or an anhydride thereof, (B) a saturated aliphatic polycarboxylic acid or an anhydride thereof, (C) an aromatic polycarboxylic acid or anhydride thereof, or (D) mixtures of A, B, or C;
I is a radical derived from an isocyanate having an isocyanate functionality greater than 2;
B is a radical derived from a monohydroxyl-terminated ester of unsubstituted or substituted acrylic or methacrylic acid wherein the substituents are halogen or $C_1$–$C_4$ alkyl groups;
y is an integer equal to from 1 to about 12.
q is 1 or zero These vinyl ester urethane resins are prepared from a polyoxyalkylene bisphenol A maleate or fumarate hydroxyl-terminated polyester oligomer, an isocyanate having an average functionality of 2.1 to 4 and a monohydroxyl-terminated ester of substituted or unsubstituted acrylic or methacrylic acid. Each of the components which may be employed in the preparation of the resins of the present invention is described in detail below.

Bisphenol A Hydroxy Terminated Polyester Oligomer (BAHPO)

The bisphenol A component employed in the preparation of the vinyl ester urethane resins of the present invention may be described as a condensate of a polyoxyalkylene bisphenol A and a polycarboxylic acid or anhydride. These materials may be prepared by, first, reacting a bisphenol A with an alkylene oxide and, subsequently, reacting the polyoxyalkylene bisphenol A with the polycarboxylic acid or an anhydride component.

As is well known to those skilled in the art, bisphenol A refers to the following compound:

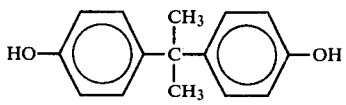

In addition to this material, substituted derivatives of bisphenol A may also be utilized in preparing the resins of the present invention. If substituted derivatives are employed, it is preferred to utilize those having the following general formula:

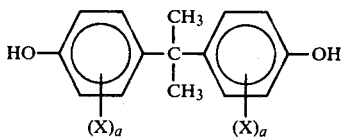

wherein X is selected from the group consisting of chlorine, bromine, and fluorine, or a $C_1$–$C_4$ alkyl groups and wherein a is an integer equal to 1 or 2. Especially preferred bisphenol A derivatives are those represented by the above general formula wherein X is selected from the group consisting of chlorine, or bromine.

The polyoxyalkylene derivatives of the bisphenol A are prepared by reacting the bisphenol A with an alkylene oxide. Suitable alkylene oxides which may be employed include, for example, ethylene oxide and propylene oxide. The preferred polyoxyalkylene derivatives of bisphenol A useful in the present invention may be represented by the following general formula:

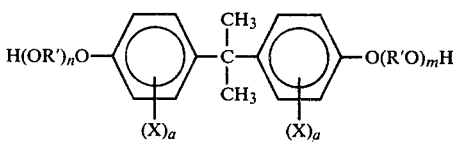

wherein
R' is $C_1$–$C_4$ alkylene group,
X is halogen
a is an integer equal to from 0 to 2, and
m and n are integers each of which is equal to at least 1 and the sum of which is equal to from about 2 to about 8.

The sum of m and n in the above formula is determined by the number of mols of alkylene oxide reacted with each mol of bisphenol A. Thus, in preparing the polyoxyalkylene derivatives of bisphenol A useful in the present invention, at least 2 and no more than about 8 mols of alkylene oxide should be reacted with each mol of bisphenol A. Preferred results are achieved when the number of mols of alkylene oxide utilized—i.e., the sum of m and n in the above formula—is equal to from about 2.2 to about 6. It has been found that, as the amount of alkylene oxide employed is increased, the properties of the uncured and cured resins change and certain of said properties such as flexibility, and lower fluidity properties improve. It is necessary to select the amount of alkylene oxide employed to achieve a resin having the desired properties in uncured and cured resins.

In the especially preferred polyoxyalkylene bisphenol A derivative, R' in the above formula is an alkylene group containing from 2 to 3 carbon atoms.

The bisphenol A hydroxy terminated polyester oligomer (BAHPO) useful in the preparation of vinyl ester urethane resins in accordance with the present invention are prepared by reacting the polyoxyalkylene bisphenol A derivatives described above with an unsaturated polycarboxylic acid or an anhydride thereof, a saturated aliphatic polycarboxylic acid or an anhydride thereof an aromatic polycarboxylic acids or an anhydride thereof or mixtures of any of the above. Unsaturated polycarboxylic acids which may be employed in preparing derivatives useful in the present invention include, for example, maleic acid and fumaric acid. Anhydrides which may also be utilized include maleic anhydride. Saturated aliphatic polycarboxylic acids which may be useful include adipic acid or azelaic acid or succinic acid among others. Aromatic polycarboxylic acids which may be useful include orthophthalic acid, isophthalic acid or terephthalic acid.

The amount of polycarboxylic acid or anhydride employed in the preparation of the BAHPO should be such that the mol ratio of alkoxylated bisphenol A to acid or anhydride is in a range that is equal to from about 2:1 to about 13:12. If ratios outside of this range are employed, the resins will not exhibit the improved properties mentioned above and discussed in detail below.

Representative polyoxyalkylene bisphenol A derivatives which may be employed include, for example, polyoxypropylene(2)-bisphenol A, polyoxyethylene (6)-bisphenol A, polyoxypropylene(4)-tetrabromobisphenol A, polyoxypropylene (2.2)-bisphenol A, and polyoxypropylene (8)-bisphenol A. The numerical notations succeeding the term "polyoxypropylene" refers to the number of oxyalkylene units present.

Isocyanate

In preparing the vinyl ester urethane resins of the present invention, any isocyanate, such as a polymethylene polyphenyl (also termed polyphenylene) isocyanate having an average isocyanate functionality of more than two such as those compounds sold under the trade names of Rubinate M polyisocyanate and PAPI polyisocyanate, may be employed. Preferred results are achieved when either of the above-mentioned polyfunctional isocyanates are employed. Additional isocyanates which may be used in preparing the resins of the invention include:
1-methylbenzene-2,4,6-triisocyanate
1,3,5-trimethylbenzene-2,4,6-triisocyanate
naphthalene-1,3,7-triisocyanate
biphenyl-2,4,4'-triisocyanate
2,4,4'-triisocyanatodiphenylmethane
3-methyldiphenylmethane-4,5,4'-triisocyanate
4,4'-dimethyldiphenylmethane-2,2',5,5'-tetraisocyanate
4,4',4''-triisocyanatotriphenylmethane
3,3'-dimethyl-4,4',6,6'-tetraisocyanato triphenylmethane
2,4,4'-triisocyanatodiphenyl ether
the reaction product of 1 mole of trimethylol propane and 3 moles of a diisocyanate such as TDI
A compound of the formula

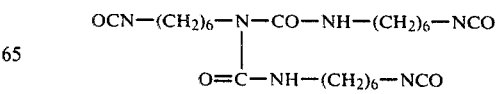

2,2',4,4'-tetraisocyanatodiphenyldisulfide 2,4-bis(isocyanatocyclohexylmethyl)cyclohexyl isocyanate
1,3,5-cyclohexane triisocyanate
bis(2,4-diisocyanato-3-methyl cyclohexyl)methane
bis(2,4-diisocyanato-5-methyl cyclohexyl)methane The term polyisocyanate as used throughout the specification means isocyanates having an average isocyanate functionality of greater than two. In preparing the vinyl ester urethane resins of the present invention care should be taken to avoid using excessive amount of the polyisocyanate to minimize the formation of undesirable by-products.

The ratio of relative amounts of BAHPO, polyfunctional isocyanate and monohydroxy acrylate should preferably satisfy the two following criteria. For a preferred embodiment where in the formula, q is equal to 1 the criteria are:

The number of isocyanate equivalents should equal the total number of hydroxy equivalents of BAHPO and monohydroxy acrylate or substituted acrylate.

For every 2 moles of polyfunctional isocyanate there should be utilized at least one mole of Bisphenol A hydroxy terminated polyester oligomer (BAHPO).

For example, if the desired choice of isocyanate is 2,4,4',-triisocyanato diphenyl methane there should be used six isocyanate equivalents (2 moles) of the triisocyanate, two hydroxy equivalents (1 mole) of BAHPO and four hydroxy equivalents of acrylate. If a polyfunctional isocyanate such as a polymethylene polyphenyl isocyanate having a NCO functionality of 2.7 is the choice as isocyanate, the ratio should be 5.4 isocyanate equivalents of the isocyanate, two hydroxy equivalents of BAHPO and 3.4 equivalents of acrylate.

For another embodiment where in the formula, q is equal to zero, the utilization of at least one mole of BAHPO for every mole of polyfunctional isocyanate is suggested.

Ester of Acrylic Acid

The monohydroxyl-terminated ester of acrylic acid or methacrylic acid which may be employed in accordance with the present invention may be pentaerythritol triacrylate, glycerol diacrylate, trimethylolpropane diacrylate, neopentylglycol monoacrylate, or those esters having the following general formula (1):

wherein
R is hydrogen or $C_1$–$C_4$ alkyl,
R' is an alkylene group containing 2 to 5 carbon atoms, and
n is an integer equal to from 1 to about 3.

The terms acrylic acid or acrylate as used throughout the specification are meant to include methacrylic acid or methacrylate whether substituted or unsubstituted. The materials of formula I maybe prepared by reacting acrylic acid with an alkylene oxide selected from the group consisting of ethylene oxide, propylene oxide, butylene oxide and pentylene oxide. The reaction is carried out by methods which are well known in the art. The integer n in the above formula is determined by the mols of alkylene oxide employed per mol of acrylic acid. In accordance with the present invention, it has been found that the desired vinyl ester urethane resins are prepared only from materials wherein this number has a value equal to from at least 1 to about 3. Preferred results have been achieved with resins in which this value of n was equal to from 1 to about 2.

Representative materials which may be employed include, for example, hydroxyl propyl methacrylate, hydroxy ethyl methacrylate, hydroxy ethyl acrylate, hydroxy propyl acrylate, polyoxyethylene(2)acrylate, polyoxyethylene(2)methacrylate, polyoxyethylene(3)acrylate, polyoxyethylene(3)methacrylate, polyoxypropylene(2)acrylate, polyoxypropylene(2)methacrylate, polyoxypropylene(3)acrylate, and polyoxypropylene(3)methacrylate.

Pentaerythritol triacrylate, glycerol diacrylate, trimethylolpropane diacrylate or neopentyl glycol monoacrylate may be prepared by esterification or transesterification, techniques well known to those skilled in the art.

The acrylate may be employed either as a single compound or as a mixture of two or more compounds. Preferred results are achieved with hydroxypropyl acrylate hydroxyethyl acrylate, hydroxy propylmethacrylate and/or hydroxyethyl methacrylate.

The vinyl ester urethane resins of the present invention may be prepared by several alternative procedures. For example, they may be prepared by reacting all three components simultaneously, by reacting the isocyanate component with either the BAHPO or the acrylate component (prepolymer technique) or by blending the BAHPO and the acrylate and subsequently thereto adding the isocyanate.

In the one-shot method, all of the components; that is, the BAHPO, the polyfunctional isocyanate, and the monohydroxyl-terminated ester of acrylic acid, are combined and the resulting reaction mixture is stirred until substantially all of the isocyanate has been reacted. This point is determined by methods which are well known in the art.

In the prepolymer method of polyfunctional isocyanate is reacted with either the acrylate or the BAHPO. It is preferred to react the isocyanate with the acrylate.

In a preferred blend technique the BAHPO is blended first with the hydroxyl-terminated ester of acrylic acid and subsequently, thereto the polyfunctional isocyanate is added to the blend. The BAHPO and hydroxyl-terminated ester of acrylic acid blend are first heated to a temperature of about 50° C. The polyfunctional isocyanate is added gradually over a period of about one hour while the reaction temperature is allowed to reach about 70°–100° C.

The urethane reaction is completed while the mixture is maintained for from about 3 to about 6 hours at temperatures of from about 70° C. to about 100° C. As will be apparent to those skilled in the art, the reaction time and temperature are interdependent variables and, as such, may be varied over a wide range. Thus, for example, if the reaction temperature is increased, the time required for completion of the reaction may be decreased. Care should be taken to avoid very high temperatures which may cause premature vinyl polymerization.

The blend technique is the preferred method because it allows for better control of the exothermic reaction and minimizes the formation of by-products. This technique also allows for some minor variation of the relative amounts of components without substantially affecting the nature of the resulting vinyl ester urethane. The alternative methods are however quite acceptable although greater care in selecting the amounts of components is desirable.

Regardless of which technique is employed, it is suggested to include in the reaction mixture a polymerization inhibitor such as hydroquinone or phenothiazine.

The resins may be prepared as a melt without the use of any solvent or the reaction may be carried out in the presence of a suitable solvent. If a solvent is employed, a vinyl monomer is preferred.

Suitable vinyl monomers which may be employed as a solvent in preparing compositions comprising the vinyl ester urethane resins are well known in the art and include, such reactive solvents as for example, styrene, chlorostyrene, t-butyl styrene, divinyl benzene, vinyl toluene, vinyl acetate, vinyl propionate, acrylic acid esters not used as one of the three components in the resin synthesis, diallyl phthalate, diallyl fumarate, and triallyl cyanurate. Nonreactive solvents useful in compositions include, ketones such as acetone or methylethyl ketone, or aromatic and aliphatic hydrocarbons.

Preferred solvents are sytrene, methyl methacrylate, chlorostyrene, divinylbenzene and mixtures thereof.

The amount of vinyl monomer solvent employed in laminate compositions can be varied over a wide range depending upon the intended use of the composition. In addition to the vinyl ester urethane resin and monomer, the compositions of the present invention may also include any of those additives which are conventionally employed in the preparation of such compositions. These include, for example, pigments to add color to the cured product; fire-retardant additives; and fillers, such as antimony oxide, silicon oxides, calcium carbonate, magnetic iron oxides, and boron oxides, to alter the physical properties of said products.

It has also been found that the properties of the vinyl ester urethane resins of the present invention may be varied depending upon the value of y, oxyalkylene units, and isocyanate functionality in the above-identified formula. Thus, it is possible to prepare a series of resins the properties of which are varied over a considerable range depending upon the ultimate use of the resin.

These compositions are particularly useful in the preparation of castings, laminates, composites, and filament wound products.

The solid vinyl ester urethane resins are also useful in, for example, moldings and castings.

The vinyl ester urethane resins of the present invention are characterized by their improved properties especially when compared with the previously available vinyl urethane resins. The resins of the present invention exhibit increased heat distortion temperatures, better retention of physical properties at elevated temperatures, excellent corrosion resistance and are useful in compositions which are fast curing and require small amounts of catalyst.

An additional advantage of the resins of the present invention is the desirably low peak exotherm temperature reached during the curing of said resins. This lower peak temperature allows for easier fabrication and makes possible the preparation of thicker laminates having uniform properties. Also, products prepared from these resins exhibit less crazing, cracking, bubbling, warpage, and delamination.

Finally, the vinyl ester urethanes may be prepared as solid materials making them particularly useful for a variety of applications.

In order to describe the present invention so that it may be more clearly understood, the following examples are set forth. These examples are given primarily for the purpose of illustration and any enumeration of detail contained therein should not be interpreted as a limitation on the concept of the present invention.

In the examples, the following standard tests, procedures, and components were employed:

Cure properties—i.e., gel time, gel to peak time, and peak temperature—were measured in accordance with the following procedure:

100 grams of the resin-containing compositions and catalyst were added to an 8-oz. jar and the mixture was stirred. The time interval between the addition of the catalyst and the point at which the free-flowing resin solution became stringy, as evidenced by the appearance of gelly-like masses, was recorded as "Gel Time." At this point, a thermocouple hooked to a recorder was inserted into the center of the composition to a point about one-half inch from the bottom of the jar. The interval between the gel time and the time at which the maximum exotherm temperature was reached is referred to as "Gel to Peak Time." The maximum exotherm temperature is referred to as "Peak Temperature."

Tensile strength was measured in accordance with A.S.T.M. Standard D-638-71a.

Flexural strength was measured in accordance with A.S.T.M. Standard D-790-71.

Barcol Hardness was determined in accordance with A.S.T.M. Standard D-2583-67.

Elongation was measured in accordance with A.S.T.M. Standard D-638-71a.

Heat distortion temperature (HDT) was measured in accordance with A.S.T.M. Standard D-648-72.

Charpy impact and Izod impact were determined in accordance with A.S.T.M. Standard D-256.

The acid number of the resin refers to the number of milligrams of potassium hydroxide required to neutralize one gram of the resin.

The percent unreacted NCO was determined by titration employing the method described in Union Carbide Bulletin F-41146 entitled "Urethane Coatings Chemicals" at page 24.

The saponification number refers to the number of milligrams of potassium hydroxide required to saponify one gram of the resin.

The hydroxyl number refers to the number of milligrams of potassium hydroxide equivalent to the hydroxyl content of one grams of the resin.

The hydroxypropyl methacrylate employed had a purity of 94 percent by weight.

EXAMPLE 1

Preparation of Polyoxyalkylene Bisphenol A Maleic Diester

Into a two-liter reaction flask equipped with a stirrer, thermometer, nitrogen inlet tube and distillation head, there were added 1414 grams (4 moles) of polyoxypropylene Bisphenol A containing an average of 2.2 moles of propylene oxide per mol of Bisphenol A and 196 grams (2 moles) of maleic anhydride. The resulting mixture was heated to from 210° C. to 215° C. and held at that temperature for 5 hours. At this time the acid number had dropped to 11.7. Vacuum was then applied to the reaction mixture for 1 hour while maintaining the temperature at 210°–215° C. After releasing vacuum, 0.81 g of hydroquinone was added. The resulting hydroxy terminated polyester oligomer was then cooled to 140° C. and poured. The final product was an amber colored semi-solid having an acid number of 8.9, a saponification number of 142 and a hydroxyl number of 145.

EXAMPLE 2

Preparation of Resin by the Blend Process

Into a 2-liter reaction flask equipped with a stirrer, thermometer, dry air inlet tube and distillation head were charged 282 g (0.358 mols) of the above hydroxy terminated polyester oligomer. The temperature was raised to 80° C. and 182 g styrene added. 190 g (1.22 moles) of 94% hydroxypropyl methacrylate were then added the temperature dropping off to 45° C. Over a period of 1 hour 255 g (0.717 moles) of Rubinate M were added dropwise the exothermic urethane reaction raising the temperature to 79° C. The temperature was raised to 90°-95° C. and held for 5 hours at which point no detectable amount of free NCO by I.R. was present. 545 g styrene were added to yield a resin 50% solids in styrene. The resin-styrene solution had a viscosity of 380 centipoises (#2 in Brookfield at 30 RPM) at room temperature. The resin-styrene solution had an acid number of 2.8, a saponification number of 101 and a hydroxyl number of 5.8.

EXAMPLE 3

Preparation of Resin by Melt Process

Into a 2-liter reaction flask equipped with a stirrer, thermometer, dry air inlet tube and distillation head were charged 394 g (0.5 mol) of the hydroxy terminated polyester oligomer described in Example 1. The temperature was raised to 108° C. and 265 g (1.70 moles) of 94% hydroxy propyl methacrylate were then added. The temperature dropped to 78° C. Over a period of 1 hour 356 g (1 mol) of polymethylene polyphenylene isocyanate of functionality 2.7 were added. The temperature rose to 113° C. due to exothermic urethane reaction. Reaction was continued for 1 hour at a final temperature of 134° C.

The resulting resin was dark amber and had a melting point 97° C. A 50% styrene solution of this resin had a viscosity of 390 cps as determined by Brookfield viscometer (#2 spindle at 30 rpm). The solid resin had an acid number of 6, a saponification number of 189 and a hydroxyl number of 20.

EXAMPLE 4

Preparation of Polyoxyalkylene Bisphenol A-Maleic Polyester (3–2 mol ratio)

In the equipment described in Example 1, were charged 1062 g (3 mols) of polyoxypropylene Bisphenol A containing an average of 2.2 mols of propylene oxide per mol of Bisphenol A and 196 g (2 mols) of maleic anhydride. The reaction mixture was heated to 210°-215° C. for 5 hours. At this time the acid number had dropped to 12. Vacuum was then applied to the reaction mass for 1½ hours while maintaining the temperature at 210°-215° C. After releasing vacuum, 0.63 g of hydroquinone was added. The resulting hydroxy terminated polyester oligomer was cooled to 140° C. and poured. The final product was an amber colored solid having an acid number of 8.4, a saponification number of 184 and a hydroxyl number of 93.

EXAMPLE 5

Preparation of Resin by Blend Process

In the equipment described in Example 2, were charged 360 g (0.295 mols) of the above hydroxy terminated polyester oligomer. The temperature was raised to 82° C. and 182 g styrene added. 156 g (1 mol) of 94% hydroxy propyl methacrylate were then added the temperature dropping off to 48° C. Over a period of 1 hour 210 g (0.59 mol) of polymethylene polyphenyl isocyanate of functionality of 2.7 were added dropwise the exothermic urethane reaction raising the temperature to 75° C. The temperature was raised to 90°-95° C. and held for 5 hours at which point the urethane reaction was complete. 545 g of styrene were added to yield a resin 50% solids in styrene. The resin-styrene solution had a viscosity of 392 cps and acid number of 2.9, saponification number of 103 and hydroxyl number of 7.0.

EXAMPLE 6

Preparation of Polyoxyalkylene Bisphenol A-Maleic Polyester (5–4 mol ratio)

In the equipment described in Example 1, were charged 1062 g (3.0 mols) of polyoxyproplene Bisphenol A containing an average of 2.2 mols of propylene oxide per mol of Bisphenol A and 235 g (2.4 mols) of maleic anhydride. The reaction mixture was heated at 210°-215° C. for 5 hours. At this time the acid number had dropped to 14. Vacuum was then applied to the reaction mass for 1½ hours while maintaining the temperature at 210°-215° C. After releasing vacuum, 0.64 g of hydroquinone was added. The resulting hydroxy terminated oligomer was cooled to 140° C. and poured. The final product was an amber colored solid having an acid number of 8.2, a saponification number of 215 and a hydroxyl number of 56.

EXAMPLE 7

Preparation of 5–4 mole ratio Resin by Blend Process

In the equipment described in Example 2, were charged 455 g (0.218 mols) of the above hydroxy terminated polyester oligomer. The temperature was raised to 110° C. and 182 g styrene added. 115.5 g (0.74 mols) of 94% hydroxy propyl methacrylate were then added the temperature dropping off to 52° C. Over a period of ¾ hour 115.2 g (0.436 mols) of polymethylene polyphenyl isocyanate of functionality of 2.7 were added dropwise the exothermic urethane reaction raising the temperature to 71° C. The temperature was raised to 90°-95° C. and held for 5 hours at which point the urethane reaction was complete. 545 g of styrene were added to yield a resin 50% solids in styrene. The resin-styrene solution had a viscosity of 420 cps and acid number of 3.4, saponification number of 120 and hydroxyl number of 9.

EXAMPLE 8

Preparation of Polyoxyalkylene Bisphenol A-Maleic Polyester (7–6 mol ratio)

In the equipment described in Example 1 were charged 826 g (2.33 mols) of polyoxypropylene Bisphenol A containing an average of 2.2 mols of propylene oxide per mole of Bisphenol A and 196 g (2 mols) of maleic anhydride. The reaction mixture was heated at 210°-215° C. for 5 hours. At this time the acid number had dropped to 13.6. Vacuum was then applied to the reaction mass for 1½ hours while maintaining the temperature at 210°–215° C. After releasing vacuum, 0.61 g of hydroquinone was added. The resulting hydroxy terminated polyester oligomer was cooled to 140° C. and poured. The final product was an amber colored solid having an acid number of 8.4, a saponification number of 226 and hydroxyl number of 38.6.

EXAMPLE 9

Preparation of 7-6 Resin by Blend Process

In the equipment described in Example 2, were charged 512 g (0.173 mols) of the above hydroxy terminated polyester oligomer. The temperature was raised to 110° C. and 182 g styrene added. 91.7 g (0.59 mols) of 95% hydroxy propyl methacrylate were then added the temperature dropping off to 54° C. Over a period of ¾ hour 123 g (0.346 mols) of polymethylene polyphenyl isocyanate of functionality 2.7 were added dropwise the exothermic urethane reaction raising the temperature to 69° C. The temperature was then raised to 90°–95° C. and held for 5 hours at which point the urethane reaction was complete. 545 g of styrene were added to yield a resin 50% solids in styrene. The resin-styrene solution had a viscosity of 422 cps and acid number of 4.2, saponification number of 128 and hydroxyl number of 11.

EXAMPLE 10

Preparation of Polyoxyalkylene (4) Bisphenol A Maleic Diester

In the equipment described in Example 1 were charged 920 g (2.0 mols) of polyoxypropylene Bisphenol A containing an average of 4.0 mols of propylene oxide per mol of Bisphenol A and 98 g (1 mol) of maleic anhydride. The reaction mixture was heated at 210°–215° C. for 5 hours. The acid number at this point was 15.6. Vacuum was then applied to the reaction mass for 1½ hours while maintaining a temperature of 210°–215° C. After releasing vacuum, 0.50 g of hydroquinone was added. The resulting hydroxy terminated polyester oligomer was cooled to 140° C. and poured. The final product was an amber colored viscous liquid having an acid number of 8.1, a saponification number of 113 and a hydroxyl number of 116.

EXAMPLE 11

Preparation of Resin based on 4 Prodendro Bisphenol by Blend Process

In the equipment described in Example 2, were charged 324 g (0.324 mols) of the above hydroxy terminated polyester oligomer. The temperature was raised to 80° C. and 182 g styrene added. 171.7 g (1.10 mols) of 94% hydroxy propyl methacrylate were then added the temperature dropping to 52° C. Over a period of 1 hour 230.7 g (0.648 mols) of polymethylene polyphenyl isocyanate of functionality 2.7 were added the exothermic urethane reaction raising the temperature to 74° C. The temperature was then raised to 90°–95° C. and held for 5 hours at which point the urethane reaction was complete. 303 g of styrene were added to yield a resin 60% solids in styrene. The resin-styrene solution had a viscosity of 380 cps and acid number of 5.1, saponification number of 92 and hydroxyl number of 9.

EXAMPLE 12

Preparation of 2.1 functionality Polymethylene Polyphenyl Isocyanate Resin by Blend Process In the equipment described in Example 2 were charged 340 g (0.432 mols) of the hydroxy terminated polyester oligomer intermediate described in Example 1. The temperature was raised to 80° C. and 182 g styrene added. 148.2 g (0.95 mols) of 94% hydroxy propyl methacrylate were then added the temperature dropping to 51° C. Over a period of 1 hour 239 g (0.863 mols) of a polymethylene polyphenyl isocyanate (functionality 2.1) were added the exothermic urethane reaction raising the temperature to 76° C. The temperature was then raised to 90°–95° C. and held for 5 hours at which point the urethane reaction was complete. 545 g of styrene were added to yield a resin 50% solids in styrene. The resin-styrene solution had a viscosity of 410 cps and acid number of 4.0, saponification number of 82 and a hydroxyl number of 8.

EXAMPLE 13

Preparation of 3.0 functionality Polymethylene Polyphenyl Isocyanate Resin by Blend Process In the equipment described in Example 2 were charged 260 g (0.33 mols) of the hydroxy terminated polyester oligomer intermediate described in Example 1. The temperature was raised to 80° C. and 182 g styrene added. 205 g (1.32 mols) of 94% hydroxy propyl methacrylate were then added the temperature dropping to 52° C. Over a period of 1 hour 261 g (0.66 mol) of a polymethylene plyphenyl isocyanate (functionality 3.0) were added the exothermic urethane reaction raising the temperature to 78° C. The temperature was then raised to 90°–95° C. and held for 5 hours at which point the urethane reaction was complete. 545 g of styrene were added to yield a resin 50% solids in styrene. The resin-styrene solution had a viscosity of 430 cps and acid number of 4.2, saponification number of 84 and a hydroxyl number of 9.

EXAMPLE 14

Preparation of 4.0 functionality Polymethylene Polyphenyl Isocyanate Resin by Blend Process In the equipment described in Example 2, were charged 206 g (0.26 mols) of the hydroxy terminated polyester oligomer intermediate described in Example 1. The temperature was raised to 80° C. and 182 g styrene added. 245 g (1.57 mols) of 94% hydroxy propyl methacrylate were then added the temperature dropping to 50° C. Over a period of 1 hour 276 g (0.52 mols) of a polymethylene polyphenyl isocyanate (functionality 4.0) were added the exothermic urethane reaction raising the temperature to 74° C. The temperature was then raised to 90°–95° C. and held for 5 hours at which point the urethane reaction was complete. 545 g of styrene were added to yield a resin 50% solids in styrene. The resin-styrene solution had a viscosity of 452 cps and acid number of 4.3 saponification number of 93 and a hydroxyl number of 8.

EXAMPLE 15

Preparation of 2.7 functionality Polymethylene Polyphenyl Isocyanate Resin by Blend Process—53% Solids In the equipment described in Example 2 were charged 282 g (0.36 mols) of the hydroxy terminated polyester oligomer intermediate described in Example 1. The temperature was raised to 80° C. and 182 g. of Styrene were added. 190 g (1.22 mols) of 94% hydroxy propyl methacrylate were then added. The temperature dropped to 54° C. Over a period of 1 hour 255 g (0.72 mols) of Rubinate M were added dropwise the exothermic urethane reaction raising the temperature to 78° C. The temperature was raised to 90°–95° C. and held for 5 hours at which point no detectable amount of free NCO by I.R. was present. 462 g. of styrene were added to yield a resin 53% solids in styrene. The resin-styrene solution had a viscosity of 640 centipoises (#2 spindle with Brookfield at 30 RPM) at room temperature. The resin-styrene solution had an acid number of 2.8, a saponification number of 106 and a hydroxyl number of 8.

EXAMPLE 16

Preparation of 2.7 functionality Polymethylene Polyphenyl Isocyanate Run by Blend Process—60% solids In the equipment described in Example 2 were charged 437 g (0.55 mols) of the hydroxy terminated polyester oligomer described in Example 1. The temperature was raised to 92° C. and 282 g. styrene were added. 294 g. (1.88 mols) of 94% hydroxy propyl methacrylate were then added after which the temperature dropped to 64° C. Over a period of 1 hour 395 g (1.11 mols) of Rubinate M were added dropwise the exothermic urethane reaction raising the temperature to 90° C. The temperature was held for 5 hours at 90°–95° C. at which point no detectable amount of free NCO by IR was present. 470 g. of styrene were added to yield a resin 60% solids in styrene. The resin-styrene solution had a viscosity of 2100 centipoises (#2 spindle with Brookfield at 12 RPM) at room temperature. The resin-styrene solution had an acid number of 4.7, a saponfication number of 107 and a hydroxyl number of 9.

Preparation of SMC from Example 16 Resin.

A urethane thickened resin system was used to prepare SMC.

| Formulation | |
|---|---|
| Parts | |
| 90.00 | Resin Styrene Solution (Example 16) |
| 4.50 | (90–10) 2.2 propoxylated Bisphenol A-202 ethoxylated Bisphenol A |
| 0.35 | 10% Toluhydroquinone solution |
| 1.00 | Trigonox 29B75 catalyst [1,1-(bis(tertiarybutylperoxy) 3,3,5,-trimethylcyclohexane] |
| 0.50 | Triethyl amine |
| 1.00 | T-12 Dibutyl Tin Di Laurate |
| 3.00 | Zinc Stearate |
| 5.50 | Rubinate M polyisocyanate |

The above formulation was scaled up to form a total of 2000 g and thoroughly mixed in a Cowles Mixer. Equal parts of the above mixture were fed into the two doctor blades of a commercially available moving belt type sheet casting machine operating at 12 ft/min. the resin was poured over chopped one inch long pre-sized fiber glass roving contained on a layer of polypropylene film on the conveyor belt, and there after cast along with additional fiber glass between another sheet of polypropylene film which passed through reduction rollers forming a compact flat glass reinforced resin sheet 12 inches wide containing nominally 65 percent glass. The resin-glass system exhibited little resin squeeze out. The sheet molding resin polypropylene film sandwich was rolled and stored. The thickened resin urethane gel exhibited excellent adherence to the glass. After 3 days storage the gel was nontacky and retained good strength and flexability. 70.7% glass was found by thermal burn off test.

To demonstrate the molding capability of the sheet molding composition, four 9-inch square were cut from the large roll after removal of the polypropylene film from each side, stacked on top of each other, and placed at the center of an 11-inch square mold. The total weight of the four 9×9 inch square was 550 g. The four 9×9 inch square were compressed at 400 lbs/square inch pressure for 4 minutes at 280° F. The fully cured 11×11 inch laminate demonstrated excellent flow-out as evidenced by even "flash" on all four sides of the mold. Upon immediately removing the part from the mold the part exhibited no tack and excellent green strength. When dropped the hot part produced a solid sound indicating it was in the plastic state.

Physical test data on the laminate follows:

| Physical Test Data | | | |
|---|---|---|---|
| | | | Test |
| Tensile Strength (psi) | Room Temp. | 43,500 | ASTM D-638 |
| | 300° F. | 19,500 | " |
| Tensile Modulus ($\times 10^6$) | Room Temp. | 2.81 | ASTM D-638 |
| | 300° F. | 1.16 | " |
| Elongation (%) | Room Temp. | 2.16 | ASTM D-638 |
| | 300° F. | 2.32 | " |
| Barcol Hardness | Room Temp. | 61–67 | ASTM D-2583 |
| | 200° F. | 46–63 | " |
| | 300° F. | 6–25 | " |

CASTING AND LAMINATE EVALUATION

Preparation of Catalyzed Resin Solution

To 500 g of the resin described in Example 2 were added 2 g (0.4%) of 6% cobalt napthenate and mixed in using a high speed stirrer. After thorough mixing there were added 5 g (1%) of Lyersol (R) DDM (MEK peroxide) which was again thoroughly mixed into the resin styrene solution. Air bubbles were removed by application of mild vacuum.

Castings were prepared by pouring the catalyzed resin solution into a mold comprising two glass plates, each of which had previously been coated with a mold release agent, spaced ⅛ inch apart, and sealed with tape on three edges. After the catalyzed resin solution was poured into the mold, the fourth edge was sealed and the resin allowed to cure at room temperature.

Gelation occurred in 45 minutes followed by an exotherm indicating vinyl polymerization was proceeding. After 24 hours the casting was post cured by heating in an oven at 100° C. for four hours after which it was cooled, removed from the mold as a clear amber sheet and tested for physical properties.

Laminates were prepared by impregnating a fiberglass mat with the resin-containing composition. The procedure employed was as follows:

A 2 ply laminate was prepared using the catalyzed resin solution by the following procedure.

(a) A sheet of polyethylene terephthalate film was placed on a flat surface and coated with catalyzed resin solution.

(b) A continuous fiberglass mat (veil) was placed on this resin layer, pressed by use of a roller to evenly distribute the resin through the glass.

(c) A chopped fiberglass mat was placed on this layer and coated again with resin solution.

(d) Another layer of mat was placed on top and this layer was coated with more resin solution. (e) This was followed by a top layer of continuous fiberglass mat (veil) and the remainder of the resin solution added. The composition was given a final roll to insure removal of air bubbles and uniform distribution of glass and resin.

(f) A layer of polyethylene terephthalate was then placed on top and rolled to eliminate bubbles of air.

The resulting article containing 25% glass was allowed to cure at room temperature for 24 hours. At the end of this time it was post cured by heating in an oven at 100° C. for four hours. After cooling the polyethylene terephthalate film was removed and the resulting laminate tested for physical properties.

The following Table I shows the results of the various physical properties.

Table I

| Castings | Resin prepared by Example 2 cured and cast as indicated hereinbefore |
|---|---|
| Flex str (psi) | 22,400 |
| Flex Mod ($10^6$ psi) | 0.50 |
| Tensile Str (psi) | 12,200 |
| Tensile Mod ($10^6$ psi) | 0.46 |
| % Elongation | 3.67 |
| HDT (°C.) | 123 |
| Charpy Impact (ft-lb/inch) | 5.75 |
| Barcol Hardness | 40–45 |

Laminate ⅛" - Same cure system

| | Resin prepared by Example 2 cured as a laminate as indicated hereinbefore |
|---|---|
| Flex Str (psi) | 14,000 |
| Flex Mod ($10^6$ psi) | 0.72 |
| Tensile Str (psi) | 13,600 |
| Tensile Mod ($10^6$ psi) | 1.11 |
| % Elongation | 1.48 |
| Falling Ball $\frac{\text{Joules}}{\text{meter}}$ | 45.7 |
| Notched Izod (ft-lb/inch of notch) | 3.96 |
| Barcol Hardness | 43–49 |

Flexural Strength at elevated temperature of Resin prepared by EX. 2 cured as indicated hereinbefore.

| 200° F. | 20,900 |
|---|---|
| 250° F. | 14,000 |
| 300° F. | 5,000 |

What is claimed is:

1. A vinyl ester urethane resin having the following formula:

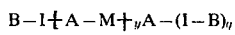

wherein

A is a radical derived from a polyoxyalkylene bisphenol, A having the following formula:

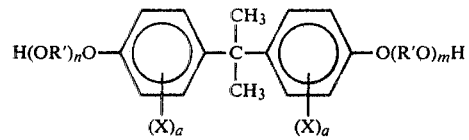

wherein

R' is $C_1$–$C_4$ alkylene group,

X is halogen or a $C_1$–$C_4$ alkyl group, a is an integer equal to from 0 to 2, and m and n are integers each of which is equal to at least 1 and the sum of which is equal from about 2.0 to about 8.0;

M is a radical derived from (A) an unsaturated aliphatic polycarboxylic acid or an anhydride thereof, (B) a saturated aliphatic polycarboxylic acid or an anhydride thereof; (C) an aromatic polycarboxylic acid or anhydride thereof, or (D) mixtures of A, B, or C;

I is a radical derived from an isocyanate; having an average isocyanate functionality greater than two, B is a radical derived from a monohydroxyl-terminated ester of acrylic acid or a methacrylic acid, y is an integer equal to from 1 to about 12.

q is an integer of one or zero.

2. A vinyl ester urethane as claimed in claim 1 wherein X is halogen and a is an integer equal to 1 or 2.

3. A vinyl ester urethane resin as claimed in claim 2 wherein X is selected from the group consisting of bromine, chlorine, and fluorine.

4. A vinyl ester urethane resin as claimed in claim 1 wherein the sum of m and n is equal to from about 2.0 to about 6.0.

5. A vinyl ester urethane resin as claimed in claim 1 wherein the polycarboxylic acid or anhydride thereof is selected from the group consisting of fumaric acid, maleic acid, and maleic anhydride.

6. A vinyl ester urethane resin as claimed in claim 1 wherein y is equal to about 1 to 5.

7. A vinyl ester urethane resin as claimed in claim 1 wherein the polyfunctional isocyanate is selected from the group consisting of polymethylene polyphenylene polyfunctional isocyanate having an average isocyanate functionality of more than two.

8. A vinyl ester urethane resin as claimed in claim 7 wherein the polyfunctional isocyanate has a average isocyanate functionality of from between 2.2 to 4.0.

9. A vinyl ester urethane resin as claimed in claim 1 wherein the hydroxyl-terminated ester of acrylic acid has the following formula:

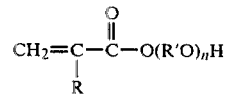

wherein

R is hydrogen or $C_1$–$C_4$ alkyl,

R' is an alkylene group containing 2 to 5 carbon atoms, and n is an integer equal to from 1 to about 3.

10. A vinyl ester urethane resin as claimed in claim 9 wherein n is equal to from 1 to about 2.

11. A vinyl ester urethane resin as claimed in claim 1 wherein the hydroxyl-terminated ester is hydroxypropyl methacrylate, hydroxyethyl methacrylate, hydroxypropyl acrylate, and hydroxy ethyl acrylate or mixtures thereof.

12. A method of preparing a vinyl ester urethane resin, said method comprising;
   (a) preparing a bisphenol A hydroxy terminated polyester oligomer by reacting a polyoxyalkylene bisphenol A having the following formula:

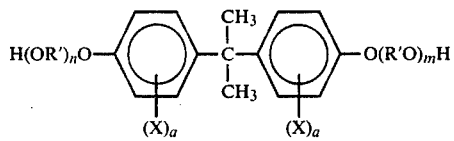

wherein
R' is $C_1-C_4$ alkylene group,
X is halogen or a $C_1-C_4$ alkyl group,
a is an integer equal to from 0 to 2, and
m and n are integers each of which is equal to at least 1 and the sum of which is equal to from about 2.0 to about 8.0; with an (A) unsaturated aliphatic polycarboxylic acid or an anhydride thereof, (B) saturated aliphatic polycarboxylic acid or an anhydride thereof, (C) an aromatic polycarboxylic acid or anhydride thereof or (D) a mixture of A, B, or C in a mole ratio of polyoxyalkylene bisphenol A to polycarboxylic acid or anhydride equal to from about 2:1 to about 13:12 and
   (b) combining the bisphenol A hydroxy terminated polyester oligomer with a polyfunctional isocyanate having an average isocyanate functionality of greater than two and a monohydroxyl-terminated ester of acrylic or methacrylic acid.

13. A method as claimed in claim 12 wherein R' is $C_1-C_4$ alkylene group containing from 2 to 3 carbon atoms.

14. A method as claimed in claim 12 wherein X is selected from the group consisting of bromine, chlorine, and fluorine.

15. A method as claimed in claim 12 wherein the sum of m and n is equal to from about 2.0 to about 6.0.

16. A method as claimed in claim 12 wherein the polycarboxylic acid or anhydride thereof is selected from the group consisting of fumaric acid, maleic acid, and maleic anhydride.

17. A method as claimed in claim 16 wherein the polycarboxylic acid or anhydride thereof is maleic anhydride.

18. A method as claimed in claim 12 wherein the molar ratio of polyoxyalkylene bisphenol A to acid or anhydride is equal to from about 2:1 to about 13:12.

19. A method as claimed in claim 12 wherein the polyfunctional isocyanate is selected from the group consisting polymethylene polyphenylene polyfunctional isocyanates having an average isocyanate functionality of more than two.

20. A method as claimed in claim 19 wherein the polyfunctional isocyanate has an average isocyanate functionality of from 2.2 to 4.0.

21. A method as claimed in claim 12 wherein the mol amount of polyfunctional isocyanate is equal to at least 1 mol per mol of bisphenol A hydroxy terminated polyester oligomer.

22. A method as claimed in claim 12 wherein the hydroxyl-terminated ester of acrylic has the following formula:

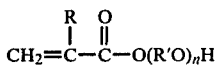

wherein
R is a $C_1-C_4$ alkyl, or hydrogen
R' is an alkylene group containing 2 to 5 carbon atoms, and
n is an integer equal to from 1 to about 3.

23. A method as claimed in claim 22 wherein n is equal to from 1 to about 2.

24. A method as claimed in claim 12 wherein the monohydroxyl-terminated ester is hydroxypropyl methacrylate, hydroxy ethyl methacrylate, hydroxypropyl acrylate, and hydroxy ethyl acrylate or mixtures thereof.

25. A method as claimed in claim 12 wherein the bisphenol A hydroxy-terminated polyester oligomer is reacted with the polyfunctional isocyanate and the hydroxyl-terminated ester of acrylic acid in the presence of a solvent.

26. A method as claimed in claim 12 wherein the hydroxyl-terminated ester of acrylic acid is blended with the bisphenol A hydroxyl-terminated polyester oligomer and the blend is then reacted with the polyfunctional isocyanate.

27. A laminate composition comprising
   (a) a vinyl ester urethane resin having the following formula:

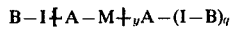

wherein
A is a radical derived from a polyoxyalkylene bisphenol A having the following formula:

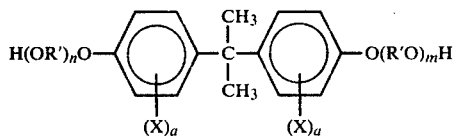

wherein
R' is a $C_1-C_4$ alkylene group,
X is halogen or a $C_1-C_4$ alkylene group,
a is an integer equal to from 0 to 2, and
m and n are integers each of which is equal to at at least 1 and the sum of which is equal to from about 2.0 to about 8.0;
M is the residue of (A) an unsaturated aliphatic polycarboxylic acid or anhydride thereof, (b) a saturated aliphatic polycarboxylic acid or an anhydride thereof, (C) an aromatic polycarboxylic acid or anhydride thereof, or (D) mixtures of A, B, or C;
I is the residue of a polyfunctional isocyanate having an isocyanate functionality of greater than two,
B is the residue of a monohydroxyl-terminated ester of acrylic or methacrylic acid:
y is an integer equal to from 1 to about 12 and
q is one or zero;
(B) a chemical initiator.

* * * * *